Patented Sept. 30, 1952

2,612,528

UNITED STATES PATENT OFFICE 2,612,528

PHENYL TRIFLUOROETHYLENE

Saul G. Cohen, Brighton, Mass., assignor to Polaroid Corporation, Cambridge, Mass., a corporation of Delaware No Drawing. Application April 16, 1949, Serial No. 88,034

1 Claim. (Cl. 260—651)

This invention has for its object the preparation of a new composition of matter, phenyl trifluoroethylene,

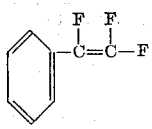

or $\alpha,\beta,\beta$-trifluorostyrene, and more particularly the preparation of such material in monomeric form as a useful polymerizable compound.

The composition of the present invention may be manufactured in the following manner:

78 g. (0.52 mole) of difluorochloroacetyl chloride,

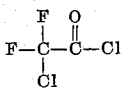

was distilled over a period of three hours into a stirred suspension of 78 g. (0.59 mole) aluminum chloride in 46 g. (0.59 mole) benzene and 200 cc. carbon disulfide. The reaction was started at 10° C. and the temperature was almost immediately reduced to 2°–3° C., at which temperature the reaction was continued until the addition of the difluorochloroacetyl chloride was completed. The reaction mixture was then brought to room temperature where it was maintained with continued stirring for one hour. The product was then decomposed in 600 g. of ice and 60 cc. of concentrated hydrochloric acid. The organic layer was separated, the aqueous layer was further extracted with ether, and the combined extracts were filtered, dried and distilled, leading to difluorochloroacetophenone

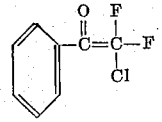

67 g., 67% yield, B. P. 95–97° C./37 mm., $n_D^{22}$ 1.4950.

76.5 g. of difluorochloroacetophenone (0.40 mole) and 125 g. (0.60 mole) phosphorus pentachloride were heated under reflux for 21 hours at a bath temperature of 185° C. The reaction mixture was cooled to room temperature and 12.6 g. (0.21 mole) of acetone added. The mixture was warmed briefly and subjected to fractional distillation leading to 76.5 g. of $\beta,\beta$-difluoro-$\alpha,\alpha,\beta$-trichloro-ethylbenzene,

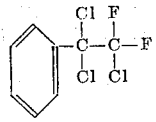

78% yield, B. P. 98–99° C./15 mm., $n_D^{22.6}$ 1.5103.

51 g. (0.21 mole) of $\beta,\beta$-difluoro-$\alpha,\alpha,\beta$-trichloro-ethylbenzene, 12.5 g. (0.070 mole) of antimony trifluoride, and 0.56 g. (0.0035 mole) of bromine were heated under reflux with stirring for one hour at 140° C. The product was taken up in ether, washed with dilute hydrochloric acid, sodium fluoride solution, aniline, hydrochloric acid, sodium bicarbonate and water, dried and distilled. There was obtained a forerun of 5.2 g. boiling from 66° to 92° C./38 mm., and three other fractions. The first of these, boiling from 92°–94° C./38 mm. with a yield of 17.8 g. and an $n_D^{22.6}$ 1.4772, was $\alpha,\beta,\beta$-trifluoro-$\alpha,\beta$-dichloroethylbenzene,

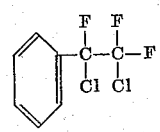

An analysis of the material obtained showed 30.3% chlorine as against a calculated quantity of 30.8%.

12.9 g. (0.056 mole) of $\alpha,\beta,\beta$-trifluoro-$\alpha,\beta$-dichloro-ethylbenzene, 3.8 g. (0.059 mole) of zinc dust, which had been washed several times with 1% hydrochloric acid and then with ethanol and ether, and dried in vacuum, and a few crystals of dried zinc chloride in 15 cc. of absolute ethanol were boiled under reflux for two hours with occasional shaking. The product was decanted from residual solid (0.37 g.), diluted with ether, washed with 10% hydrochloric acid and water, dried and distilled. There was obtained 4.3 g. (48% yield) of $\alpha,\beta,\beta$-trofluorostyrene or phenyl trifluoroethylene

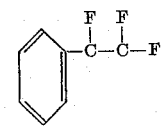

having a boiling point of 68°–70° C. at 75 mm., a melting point of −23° to −22° C., and an $n_D^{23.6}$ 1.4723. A sample was analyzed with the following result:

Amount calculated—
C—60.8%, H—3.2%, F—36.0%
Amount found —
C—60.5%, H—3.1%, F—35.7%

There was thus obtained a new composition of matter, phenyl trifluoroethylene in monomeric form, a water-clear, nonviscous liquid having a slight but inoffensive odor; a useful polymerizable compound.

It is to be understood that the preferred method of manufacturing the new composition of matter is not to be deemed to limit the invention. Other methods of manufacture may, if desired, be employed. For example, this material may be produced by the treatment of α,β,β,β,-tetrafluoro-α-chloro-ethylbenzene

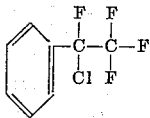

with zinc in alcohol, or the process which has here been described, in connection with the manufacture of the novel compound, may be modified by employing ether instead of alcohol in connection with the reaction of the zinc and α,β,β-trifluoro-α,β-dichloro-ethylbenzene. Other modifications of the process may, if desired, be employed.

It may perhaps be well to point out that the difluorochloroacetyl chloride employed in the initial step of the manufacturing process described may preferably be obtained by the reaction of sodium difluorochloroacetate and phosphorus oxychloride under reflux, although the material has also been prepared by the chlorination of difluoroethanol.

What is claimed is:

Phenyl trifluoroethylene.

SAUL G. COHEN.

REFERENCES CITED

The following references are of record in the file of this patent:

UNITED STATES PATENTS

| Number | Name | Date |
| --- | --- | --- |
| 2,378,453 | Weinmayer | June 19, 1945 |
| 2,398,483 | Weinmayer | Apr. 16, 1946 |

OTHER REFERENCES

McBee et al., Industrial and Engineering Chem., vol. 39, p. 384–6 (1947).